W. A. FUSCH.
GUIDE BOARD.
APPLICATION FILED OCT. 27, 1913.

1,150,668.

Patented Aug. 17, 1915.

WITNESSES
L. H. Schmidt
Amos W. Hart

INVENTOR
WARNIE A. FUSCH,
BY Munn & Co.
ATTORNEYS

UNITED STATES PATENT OFFICE.

WARNIE ALBERT FUSCH, OF DECATUR, ILLINOIS.

GUIDE-BOARD.

1,150,668. Specification of Letters Patent. Patented Aug. 17, 1915.

Application filed October 27, 1913. Serial No. 797,516.

*To all whom it may concern:*

Be it known that I, WARNIE A. FUSCH, a citizen of the United States, and a resident of Decatur, in the county of Macon and State of Illinois, have invented an Improvement in Guide-Boards, of which the following is a specification.

My invention is a guide-board bearing a diagrammatic illustration of a district with township sections and roads indicated by differentiated lines, and having a movable device adapted to be set in the guide-board at any desired point and which serves to indicate the location of said guide-board in the particular district or township delineated by the map on its face. The guide-board has a border on which are inscribed names of towns, and other locations lying outside the one in which the guide-board itself is located, and also the distances of such towns and locations from points indicated on the map proper.

The details of the invention will be understood from the following description and the illustrations in the accompanying drawing, in which—

Figure 1:
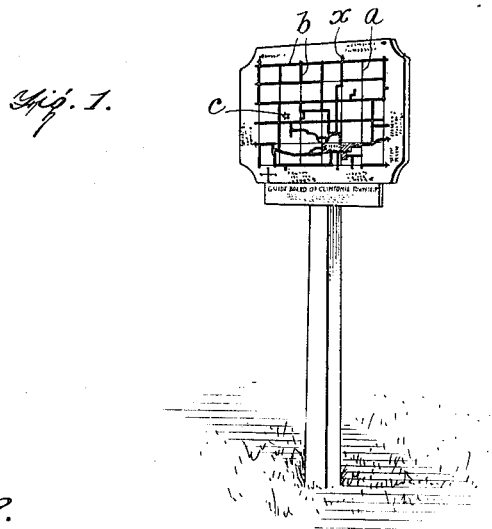
Figure 2:
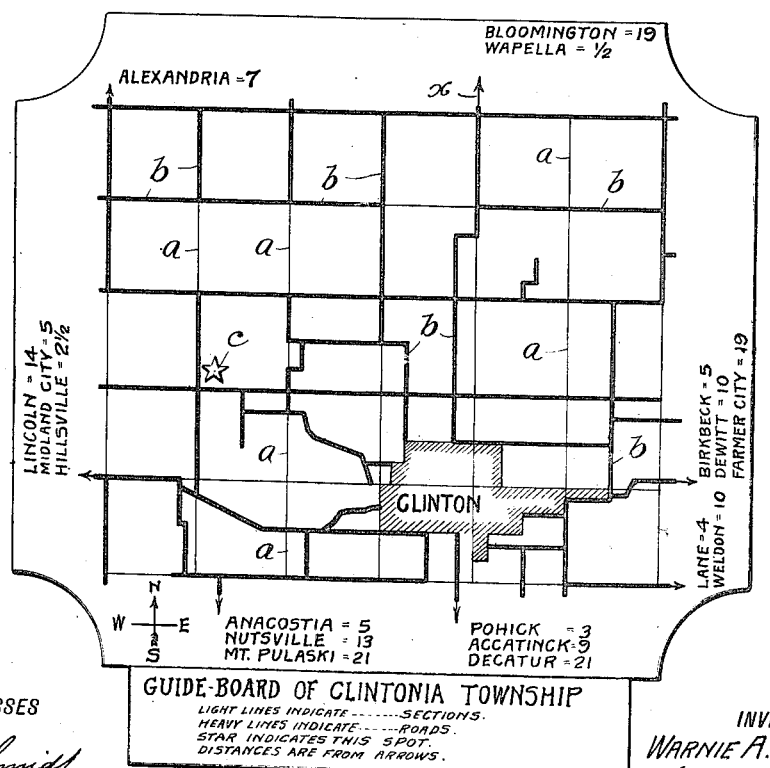

Figure 1 is a perspective view of my improved guide-board, and Fig. 2 is an enlarged face view of the same.

In practice, the guide-board is preferably constructed of metal, and is supported by a post or other fixed object at the intersection of roads in a township or district.

In the outline map or diagram represented on the guide-board, the light lines $a$ indicate divisions between sections and the heavy lines $b$ indicate roads. At the point in the map or diagram corresponding to the location of the guide-board itself in the township or district is an indicator $c$ which is represented in the form of a star, mounted on a screw-bolt or other device adapted for securing it to the guide-board. The word "Clinton" appears on the face of the map and indicates the location in the township or district of a village of that name.

On the border surrounding the map or diagram are inscribed the names of adjacent towns or cities and the distance of each from the border of the township, which may be supposed to be named "Clintonia" as indicated on the lower portion of the border. Arrows projecting from the border of the map or diagram indicate the points from which distances are reckoned to adjacent or other towns or villages. Thus, on the upper border, the distance to Alexandria from the point where the adjacent arrow is located is seven miles, and the distance to Bloomington from the adjacent arrow is nineteen miles, and to Wapella one-half mile.

To illustrate the practical use of the guide-board, let it be supposed that a traveler desires to go to Bloomington by the nearest way, the same being located nineteen miles from the north township line. The traveler being located at a point in the township indicated by the star, he will find that, by following the heavy lines, the distance to the border of the township at the point where the arrow $x$ is located is six miles and the distance to Bloomington added, makes the entire distance twenty-five miles. On the other hand, if the traveler desires to go to the village of Clinton from the point indicated by the star, by observing the heavy lines which indicate the nearest roads, he is able to take the shortest route which is indicated by an inclined or irregular line.

The points of the compass are indicated on the lower border of the guide-board and also an explanation of the light and heavy lines, etc.

I claim:—

1. A guide-board having its face inscribed with an outline road map or diagram of a township or district of the township or district in which the guide-board is located, and an indicator inserted detachably in the face of the guide-board at the point which indicates its location in the township delineated on the board, as described.

2. A road map designed for definite road location and having road designations thereon, and indicating means on the face of the map corresponding to its destined location.

WARNIE ALBERT FUSCH.

Witnesses:
FRANK H. ECKERT,
JOHN H. McCOY.